United States Patent
Shibata et al.

(10) Patent No.: US 10,541,440 B2
(45) Date of Patent: Jan. 21, 2020

(54) FUEL CELL STACK

(71) Applicant: TOYOTA JIDOSHA KABUSHIKI KAISHA, Toyota-shi, Aichi-ken (JP)

(72) Inventors: Kazunori Shibata, Mishima (JP); Takashi Kajiwara, Gotemba (JP); Kohsei Yoshida, Gotemba (JP); Atsushi Ida, Nisshin (JP); Joji Tomiyasu, Toyota (JP); Koji Fukunaga, Toyota (JP); Naohiro Hoshikawa, Inazawa (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/898,338

(22) Filed: Feb. 16, 2018

(65) Prior Publication Data

US 2018/0241070 A1 Aug. 23, 2018

(30) Foreign Application Priority Data

Feb. 20, 2017 (JP) ................. 2017-029429

(51) Int. Cl.
*H01M 2/38* (2006.01)
*H01M 8/2485* (2016.01)
*H01M 8/0258* (2016.01)

(52) U.S. Cl.
CPC ....... *H01M 8/2485* (2013.01); *H01M 8/0258* (2013.01)

(58) Field of Classification Search
CPC .................... H01M 8/2485; H01M 8/0258
See application file for complete search history.

(56) References Cited

U.S. PATENT DOCUMENTS

2007/0231619 A1   10/2007   Strobel et al.
2012/0156584 A1   6/2012   Uehara

FOREIGN PATENT DOCUMENTS

| JP | 2006-504872 A | 2/2006 |
| JP | 2016-048620 A | 4/2016 |
| JP | 2016-081909 A | 5/2016 |
| WO | 2011-114811 A1 | 9/2011 |

*Primary Examiner* — Jane J Rhee
(74) *Attorney, Agent, or Firm* — Hunton Andrews Kurth LLP (57) ABSTRACT

A fuel cell stack includes a plurality of single cells stacked and a manifold. The plurality of single cells each include a first separator including a seal portion surrounding the manifold and including a hollow protrusion and a fluid passage portion allowing the fluid to flow between the manifold and a space on the opposite side of the seal portion from the manifold via the hollow of the seal portion, a second separator disposed on the side opposite to the side on which the seal portion projects, of the first separator, and an electric insulating frame disposed on the opposite side of the second separator from the first separator. The second separator includes a flat-and-bulge portion in a surface facing the seal portion, along an abutment region of the seal portion and the electric insulating frame.

9 Claims, 12 Drawing Sheets

FUEL CELL STACK

INCORPORATION BY REFERENCE

The disclosure of Japanese Patent Application No. 2017-029429 filed on Feb. 20, 2017 including the specification, drawings and abstract is incorporated herein by reference in its entirety.

BACKGROUND

1. Technical Field

The present disclosure relates to a fuel cell stack.

2. Description of Related Art

Fuel cell stacks each including a plurality of stacked single cells and manifolds that are provided so as to extend through the plurality of single cells and each allow a fluid to flow therein have been known. In order to suppress external leakage of the fluid flowing in each manifold from between single cells, a seal portion is provided around the periphery of the manifold to encapsulate the fluid. For example, it is known that a seal portion formed of a hollow protrusion is provided in a separator so as to surround a manifold and a fluid is encapsulated as a result of the seal portion being brought into abutment with an adjacent single cell (for example, Published Japanese Translation of PCT Application No. 2006-504872).

SUMMARY

In order to make a fluid flow between a manifold and a single cell, it is conceivable that in addition to a seal portion formed of a hollow protrusion surrounding the manifold, a fluid passage portion that allows the fluid to flow between the manifold and a space on the opposite side of the seal portion from the manifold via a hollow of the seal portion is provided in a separator. In this case, when the seal portion is brought into abutment with an adjacent single cell and thus dented to encapsulate the fluid flowing in the manifold, a flow passageway of the fluid flowing via the hollow of the seal portion is narrowed, which may result in difficulty in the fluid flowing.

The present disclosure suppresses difficulty in a fluid flowing in a flow passageway between a manifold and a single cell.

An aspect of the present disclosure relates to a fuel cell stack including a plurality of single cells stacked, and a manifold that is provided so as to extend through the plurality of single cells and allows a fluid to flow therein. Each single cell of the plurality of single cells includes a first separator including a protrusion including (i) a seal portion that surrounds a periphery of the manifold and (ii) a fluid passage portion, a first member disposed on a side of the first separator such that (i) a first space is arranged between the protrusion and the first member and (ii) the fluid passage portion allows the fluid to flow between the manifold and a second space on an opposite side of the seal portion from the manifold via the first space, the side being opposite to a side on which the seal portion projects, and a second member that is provided on the opposite side of the first member from the first separator and includes a first elastic member. The seal portion of a first single cell from among the plurality of single cells is in abutment with the second member of a second single cell adjacent to the first single cell, and the first member of the first single cell includes a flat-and-bulge portion in a surface of the first member, the surface facing the seal portion, the flat-and-bulge portion extending along a region where the seal portion of the first single cell and the second member of the second single cell abut against each other.

The seal portion or the second member of each single cell may include a protrusion, and the seal portion of the first single cell and the second member of the second single cell may be in abutment with each other via the protrusion.

The fluid passage portion may extend so as to cross the seal portion, and a third space may be arranged between the fluid passage portion and the first member.

The fluid passage portion may include a through-hole that is provided in a side wall of the seal portion and makes the first space and the outside of the seal portion communicate with each other.

The second member may include rubber or an elastomer resin.

Each single cell may include a separator, the first member may be the separator, and the second member may be an electric insulating frame surrounding a membrane electrode assembly of the single cell.

Each single cell may include a second separator, the first member may be an electric insulating frame held between the first separator and the second separator, and the second member may be a second elastic member disposed on a surface on the opposite side of the second separator from the electric insulating frame.

The flat-and-bulge portion of the first member may include a plurality of bulge portions or a plurality of dent portions extending in a flat surface of the first member along the region where the seal portion and the second member abut against each other.

The flat-and-bulge portion of the first member may include the flat-and-bulge portion as a result of a wave-shaped bulge portion extending along the region where the seal portion and the second member abut against each other and having an amplitude in a direction parallel to a flat surface being provided in the flat surface.

The present disclosure enables suppression of difficulty in a fluid flowing in a flow passageway between a manifold and a single cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below with reference to the drawings.

First Embodiment

Figure 1:
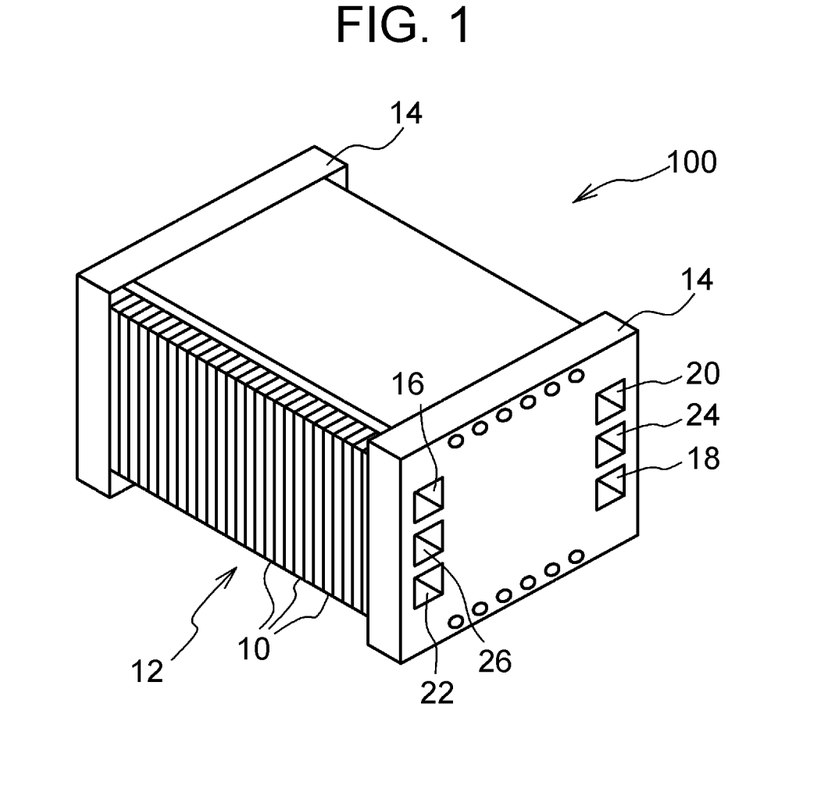
FIG. 1 is a perspective view of a fuel cell stack according to a first embodiment.

FIG. 1 is a perspective view of a fuel cell stack according to a first embodiment. As illustrated in FIG. 1, a fuel cell stack 100 includes a cell stack 12 including a plurality of single cells 10 stacked, and a pair of end plates 14 holding opposite ends in a stacking direction of the cell stack 12 therebetween. Each single cell 10 is a polymer electrolyte fuel cell that generates electric power upon supply of a fuel gas (for example, hydrogen) and an oxidant gas (for example, air) as reactant gases.

Manifolds extending through the cell stack 12 from one end plate 14 of the pair of end plates 14 are provided. The manifolds include a fuel gas supply manifold 16 and a fuel gas discharge manifold 18 for the fuel gas, an oxidant gas supply manifold 20 and an oxidant gas discharge manifold 22 for the oxidant gas, and a coolant supply manifold 24 and a coolant discharge manifold 26 for a coolant.

Figure 2A:
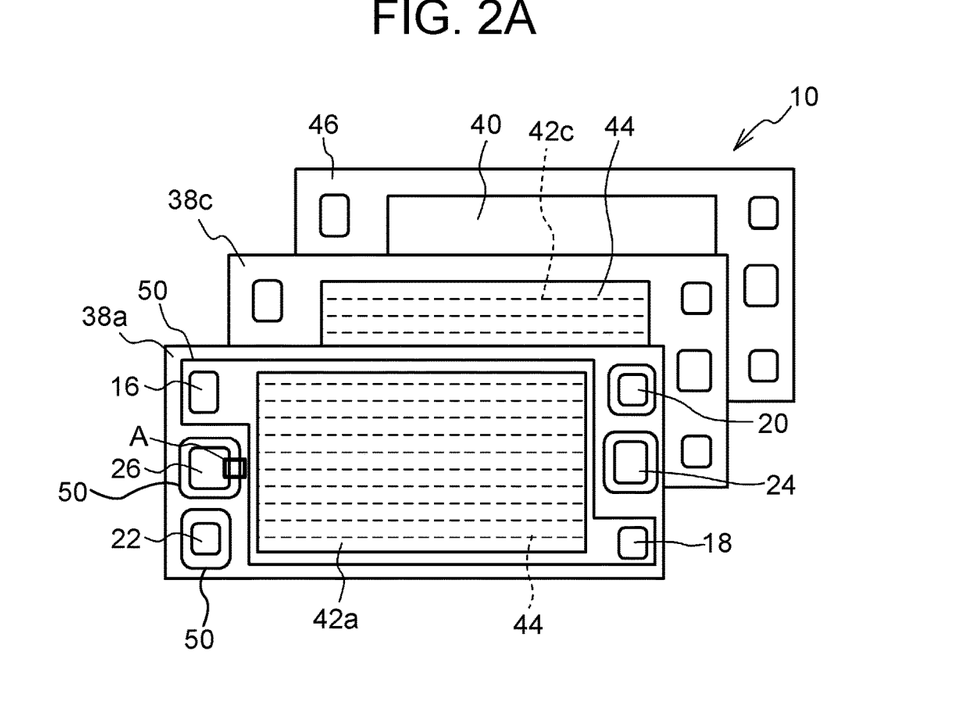
FIG. 2A is an exploded plan view of a single cell in the first embodiment.
Figure 2B:
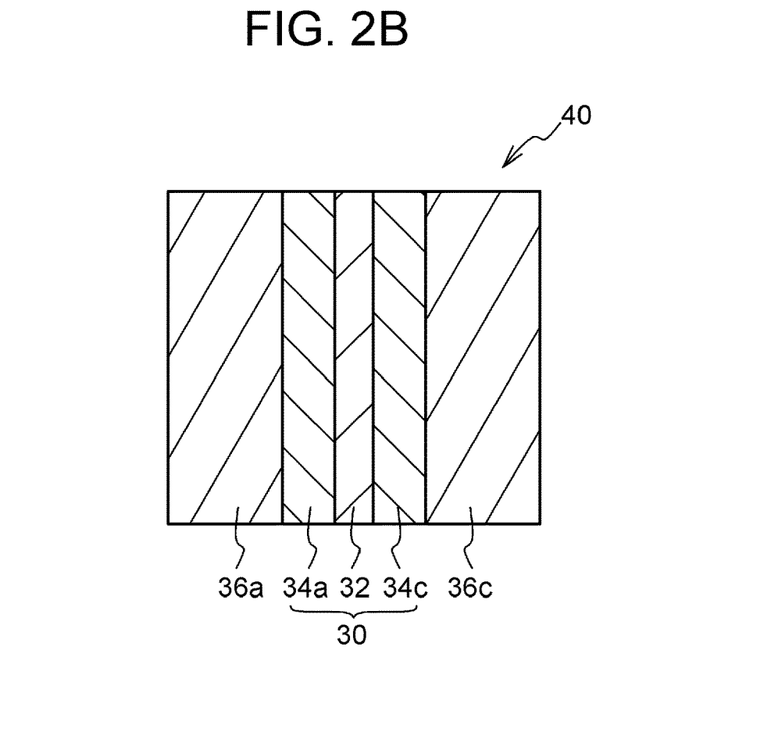
FIG. 2B is a sectional view of a membrane electrode gas diffusion layer assembly.

FIG. 2A is an exploded plan view of a single cell in the first embodiment, and FIG. 2B is a sectional view of a membrane electrode gas diffusion layer assembly. As illustrated in FIG. 2A, a single cell 10 includes an anode-side separator 38a, a cathode-side separator 38c, a membrane electrode gas diffusion layer assembly (MEGA) 40, and an electric insulating frame 46 surrounding the MEGA 40. The anode-side separator 38a, the cathode-side separator 38c and the electric insulating frame 46 are disposed in this order. The anode-side separator 38a and the cathode-side separator 38c are each formed by a member having gas blocking property and electron conductivity, for example, a metal member such as a press-molded stainless steel. The electric insulating frame 46 is formed by an elastic member such as rubber or an elastomer resin (for example, a thermoplastic elastomer resin).

In a surface on the opposite side of the anode-side separator 38a from the cathode-side separator 38c, an anode gas flow channel 42a in which the fuel gas flows, the anode gas flow channel 42a making the fuel gas supply manifold 16 and the fuel gas discharge manifold 18 communicate with each other, is formed. In a surface on the opposite side of the cathode-side separator 38c from the anode-side separator 38a, a cathode gas flow channel 42c in which the oxidant gas flows, the cathode gas flow channel 42c making the oxidant gas supply manifold 20 and the oxidant gas discharge manifold 22 communicate with each other, is formed. In each of surfaces, on the respective sides facing each other, of the anode-side separator 38a and the cathode-side separator 38c, a coolant flow channel 44 in which the coolant flows, the coolant flow channel 44 making the coolant supply manifold 24 and the coolant discharge manifold 26 communicate with each other, is formed.

The anode-side separator 38a is provided with seal portions 50 that each suppress external leakage of the fluid flowing in the relevant manifold. Each seal portion 50 is provided so as to surround the periphery of the relevant manifold.

As illustrated in FIG. 2B, the MEGA 40 includes a membrane electrode assembly (MEA) 30 including an electrolyte membrane 32, an anode catalyst layer 34a provided on one surface of the electrolyte membrane 32 and a cathode catalyst layer 34c provided on another surface of the electrolyte membrane 32. The electrolyte membrane 32 is a solid polymer membrane formed by a fluorine-based resin material or a carbon-based resin material including a sulfonic acid group, and has favorable protonic conductivity in a wet state. The anode catalyst layer 34a and the cathode catalyst layer 34c include carbon particles supporting a catalyst causing progress of an electrochemical reaction (for example, platinum or a platinum-cobalt alloy) (for example, carbon black) and an ionomer, which is a solid polymer including a sulfonic acid group and has favorable protonic conductivity in a wet state.

A pair of gas diffusion layers (an anode gas diffusion layer 36a and a cathode gas diffusion layer 36c) is disposed on the opposite sides of the MEA 30. The MEGA 40 is formed by the MEA 30 and the pair of gas diffusion layers. The anode gas diffusion layer 36a and the cathode gas diffusion layer 36c are each formed by a member having gas permeability and electron conductivity, for example, a member formed of porous carbon such as carbon cloth or carbon paper.

Figure 3A:
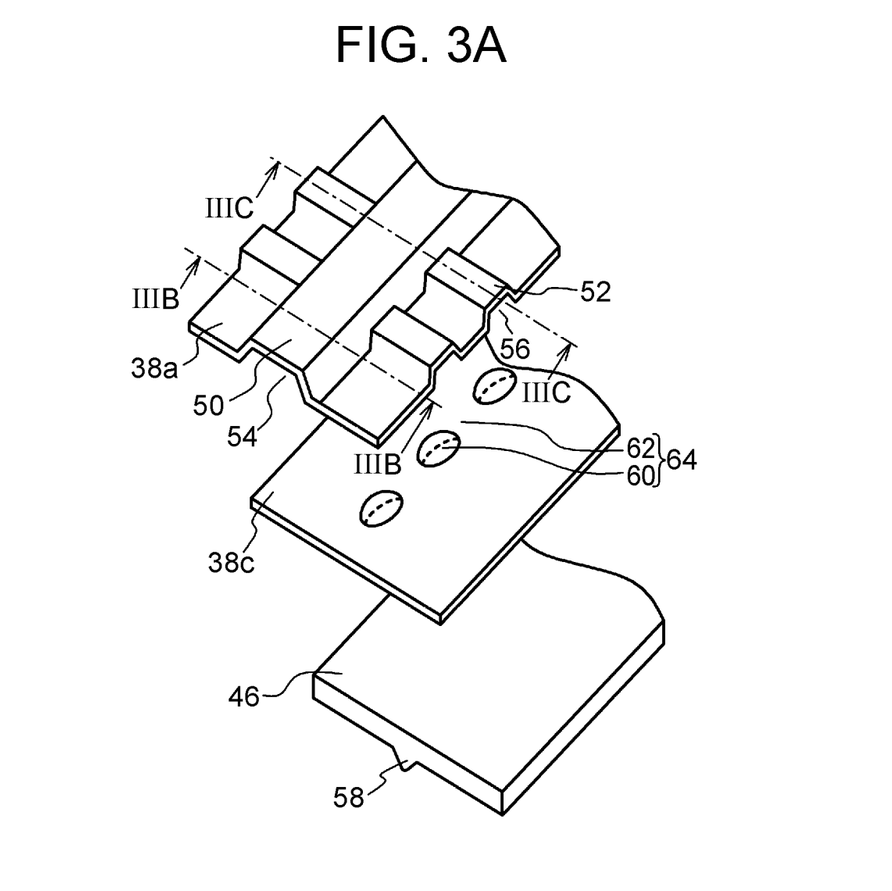
FIG. 3A is an exploded perspective view of a single cell in the first embodiment before stacking.
Figure 3B:
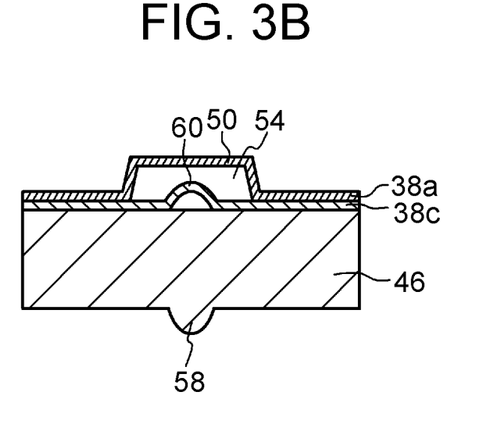
FIG. 3B is a sectional view along line IIIB-IIIB in FIG. 3A.
Figure 3C:
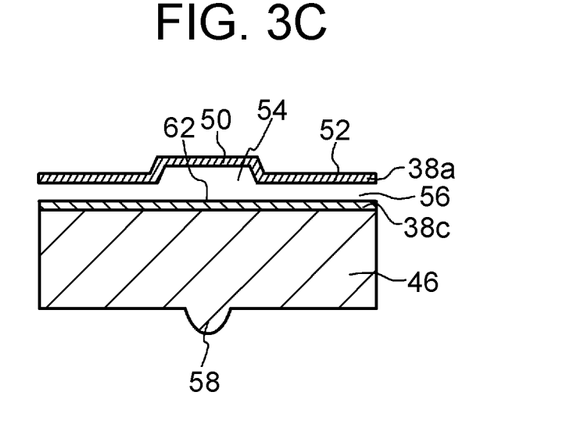
FIG. 3C is a sectional view along line IIIC-IIIC in FIG. 3A.

FIG. 3A is an exploded perspective view of a single cell in the first embodiment before staking, FIG. 3B is a sectional view along line IIIB-IIIB in FIG. 3 and FIG. 3C is a sectional view along line IIIC-IIIC in FIG. 3A. Although FIG. 3A is an exploded perspective view of, for example, area A in the periphery of the coolant discharge manifold 26 in FIG. 2A, the structure described below is applicable also to an area in the periphery of each of the fuel gas supply manifold 16, the fuel gas discharge manifold 18, the oxidant gas supply manifold 20, the oxidant gas discharge manifold 22 and the coolant supply manifold 24.

As illustrated in FIGS. 3A to 3C, an anode-side separator 38a is provided with a seal portion 50 that encapsulates the fluid flowing in the relevant manifold so as to prevent leakage of the fluid to the outside of the fuel cell stack 100, and a plurality of fluid passage portions 52 that allow the fluid to flow between the manifold and the relevant flow channel provided on the opposite side of the seal portion 50 from the manifold. The fluid passage portions 52 extend in a direction in which the fluid passage portions 52 cross the seal portion 50. The seal portion 50 is formed by a hollow protrusion so as to function as a metal spring and includes a hollow 54 inside. The fluid passage portions 52 are each formed by a hollow protrusion so as to allow the fluid to flow therethrough and include a hollow 56 inside. The hollow 54 of the seal portion 50 and the hollows 56 of the fluid passage portions 52 are joined, and the fluid flowing in the fluid passage portions 52 flow via the hollow 54 of the seal portion 50. The seal portion 50 and the fluid passage portion 52 are each formed by means of, for example, press working. In FIG. 2A, two seal portions 50 are provided side by side between the coolant discharge manifold 26 and the flow channel, and thus, the coolant flowing in the fluid passage portions 52 flows via the hollows 54 of the two seal portions 50. In the present embodiment, the coolant is discharged from the coolant flow channel 44 to the coolant discharge manifold 26 via the fluid passage portions 52.

In a flat surface of a part of the cathode-side separator 38c, the part facing the seal portion 50, a plurality of hemispherical bulge portions 60 are formed in a dotted manner along a direction in which the seal portion 50 extends. In other words, the bulge portions 60 are positioned inside the hollow 54 of the seal portion 50. The bulge portions 60 are formed by means of, for example, press working. As a result of the plurality of bulge portions 60 being dotted, in the surface of the cathode-side separator 38c, the surface facing the seal portion 50, a flat-and-bulge portion 64 that includes the bulge portions 60 and flat portions 62 between the respective bulge portions 60 and extends along the direction in which the seal portion 50 extends is formed. The flat-and-bulge portion 64 is provided, for example, as with the seal portion 50, so as to completely surround the periphery of the manifold.

The electric insulating frame 46 includes a protrusion 58 in a part positioned immediately below a seal portion 50 provided in a surface on the opposite side of an anode-side separator 38a from a cathode-side separator 38c of an adjacent single cell. The protrusion 58 extends along the direction in which the seal portion 50 extends, and is provided, for example, as with the seal portion 50, so as to completely surround the periphery of the manifold.

Figure 4A:
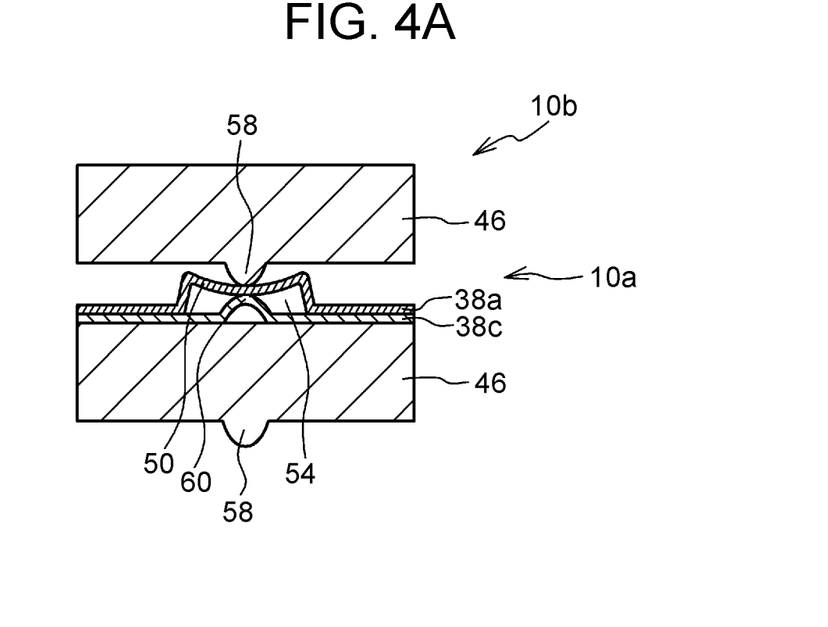
FIG. 4A is a sectional view of single cells in the first embodiment after stacking.
Figure 4B:
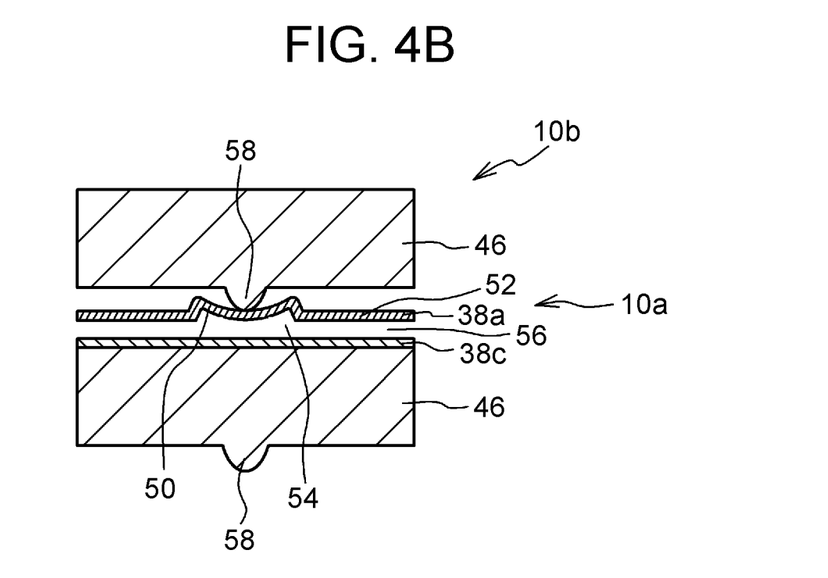
FIG. 4B is a sectional view of single cells in the first embodiment after stacking.

FIGS. 4A and 4B are sectional views of single cells in the first embodiment after stacking. FIG. 4A is a sectional view along line IIIA-IIIA in FIG. 3A, and FIG. 4B is a sectional view along line in FIG. 3A. As illustrated in FIGS. 4A and 4B, a seal portion 50 provided in an anode-side separator 38a of a first single cell 10a in the cell stack 12 is in abutment with a protrusion 58 provided in an electric insulating frame 46 of a second single cell 10b adjacent to the first single cell 10a. Consequently, a reaction force is generated as a result of elastic deformation of the seal portion 50, and the fluid flowing in the manifold is thus encapsulated.

Figure 5A:
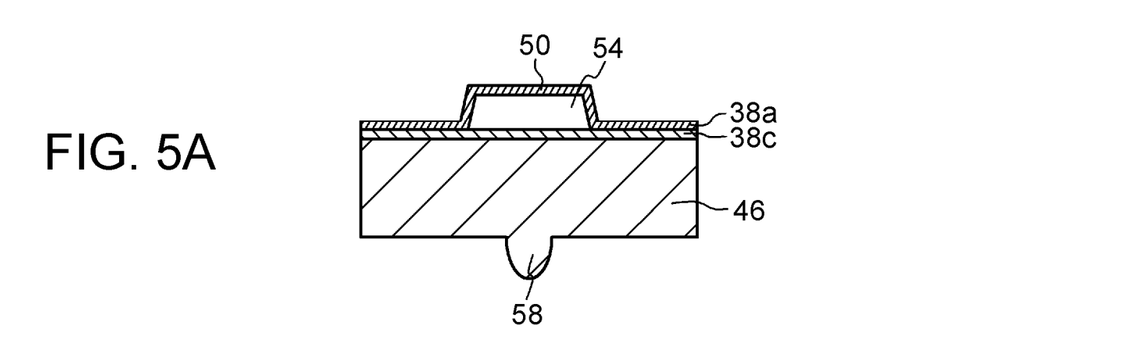
FIG. 5A is a sectional view of a single cell in a comparative example before stacking.
Figure 5B:
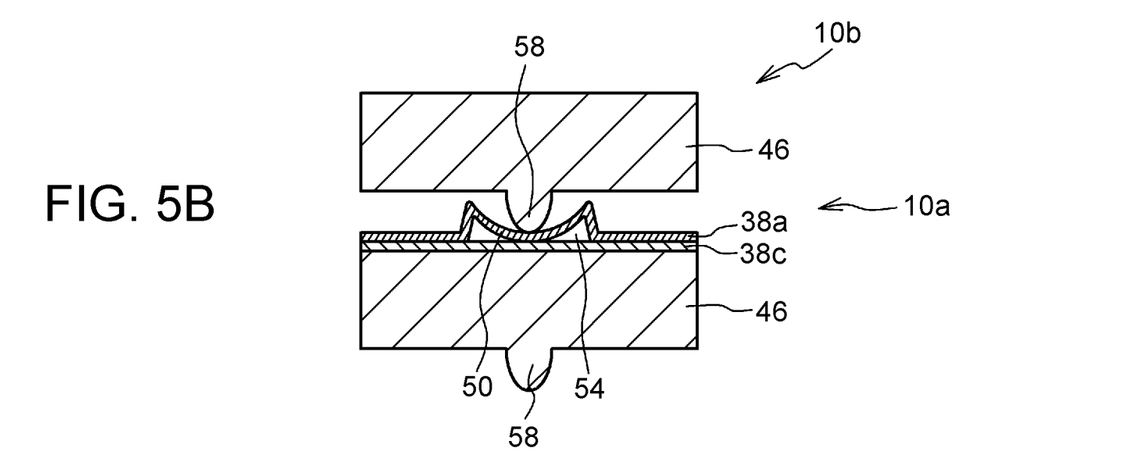
FIG. 5B is a sectional view of single cells after stacking.
Figure 5C:
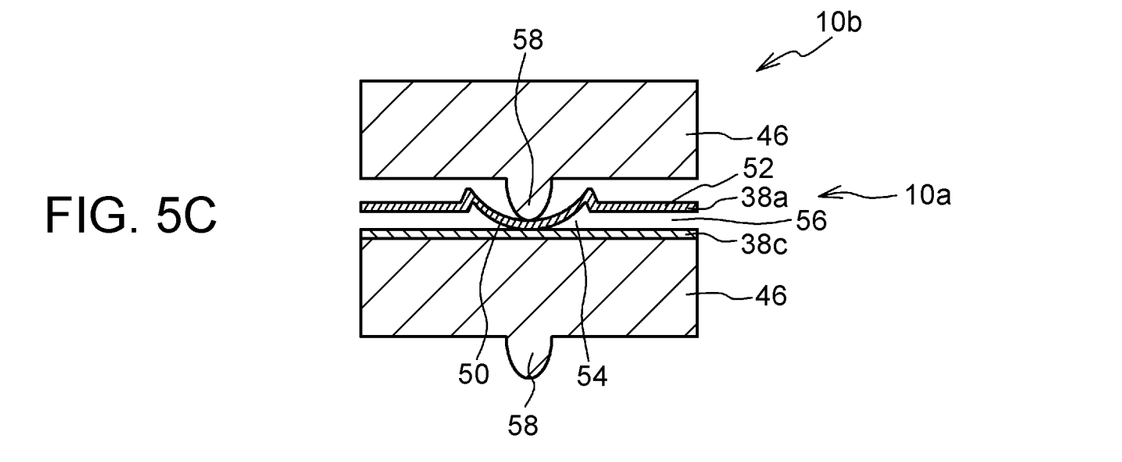
FIG. 5C is a sectional view of single cells after stacking.

Here, for describing effects of the first embodiment, a fuel cell stack according to a comparative example will be described. FIG. 5A is a sectional view of a single cell in a comparative example before stacking, and FIGS. 5B and 5C are sectional views of single cells after stacking. As illustrated in FIG. 5A, in the comparative example, no bulge portions are formed in a surface of a cathode-side separator 38c, the surface facing a seal portion 50. The rest of the configuration is the same as that of the first embodiment and thus description thereof will be omitted.

As illustrated in FIGS. 5B and 5C, a seal portion 50 provided in an anode-side separator 38a of a first single cell 10a is in abutment with a protrusion 58 provided in an electric insulating frame 46 of a second single cell 10b adjacent to the first single cell 10a. A surface of the cathode-side separator 38c, the surface being exposed to a hollow 54 of the seal portion 50, has a flat shape. Thus, upon the seal portion 50 being dented as a result of the electric insulating frame 46 being brought into abutment with the seal portion 50, a flow passageway of a fluid flowing in fluid passage portions 52 is narrowed or obstructed, resulting in difficulty or failure in the fluid flowing in the fluid passage portions 52.

On the other hand, in the first embodiment, as illustrated in FIGS. 3A to 4B, in the surface of the cathode-side separator 38c, the surface facing the seal portion 50, the flat-and-bulge portion 64 is extended along a region where the seal portion 50 and the electric insulating frame 46 abut against each other. Consequently, even if the seal portion 50 is dented as a result of being brought into abutment with the electric insulating frame 46, the amount of dent of the seal portion 50 is limited by the bulge portions 60, and thus a flow passageway for the fluid flowing in the fluid passage portions 52 can be secured. Therefore, difficulty in the fluid flowing in the fluid passage portions 52 can be suppressed. Here, in the first embodiment, the anode-side separator 38a corresponds to the first separator in the claims, the cathode-side separator 38c corresponds to the first member, and the electric insulating frame 46 corresponds to the second member.

Also, according to the first embodiment, the protrusion 58 is provided in the electric insulating frame 46, and the seal portion 50 and the electric insulating frame 46 are in abutment with each other via the protrusion 58. Consequently, pressure of the surface of contact between the seal portion 50 and the electric insulating frame 46 can be enhanced, enabling more reliable encapsulation of the fluid. Also, no protrusion 58 may be provided in the electric insulating frame 46.

Also, according to the first embodiment, the fluid passage portions 52 each include a hollow protrusion extending in the direction in which the fluid passage portions 52 cross the seal portion 50. Consequently, side surfaces of the seal portion 50 are enhanced in strength, and when the seal portion 50 and the electric insulating frame 46 are brought into abutment with each other, deformation of the side surfaces of the seal portion 50 is effectively suppressed and thus a fluid flow path can be secured.

Figure 6:
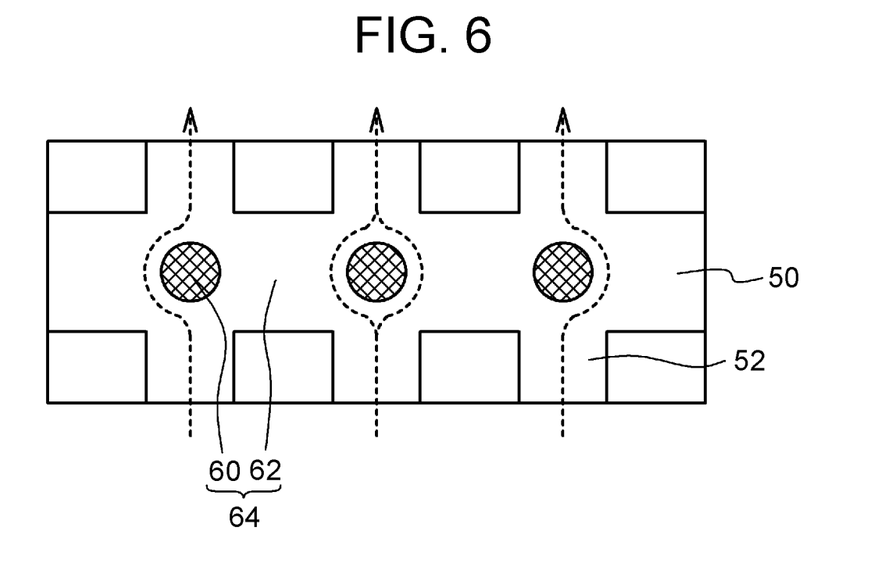
FIG. 6 is a plan view of a single cell for describing the flow of a fluid.

Also, according to the first embodiment, as illustrated in FIGS. 3C and 4B, the bulge portions 60 provided in the cathode-side separator 38c are not disposed at parts corresponding to parts in which the fluid passage portions 52 and the seal portion 50 cross each other. Consequently, the fluid can be made to smoothly flow. Also, bulge portions 60 may be disposed at parts corresponding to the parts in which the fluid passage portions 52 and the seal portion 50 cross each other. In this case, also, as illustrated in FIG. 6, the fluid can flow avoiding the bulge portions 60. In consideration of the fluid flowing avoiding the bulge portions 60, it is preferable that the bulge portions 60 have a round shape or an elliptical shape in plan view.

Also, according to the first embodiment, the electric insulating frame 46 that is in abutment with the seal portion 50 of the anode-side separator 38a is formed of rubber or an elastomer resin. As described above, as a result of the electric insulating frame 46 itself having elasticity, the number of components can be reduced compared to the case where a separate elastic member is provided at the electric insulating frame 46. However, the present disclosure is not limited to the case where the electric insulating frame 46 is formed of rubber or an elastomer resin, it is possible that the electric insulating frame 46 is formed of a resin material having no elasticity and includes an elastic material formed of rubber or an elastomer resin at a part that is to be in abutment with the seal portion 50.

In the first embodiment, the anode-side separator 38a provided with the seal portion 50 and the cathode-side separator 38c provided with the flat-and-bulge portion 64 may be formed of a same material or may be formed of different materials. Even if the anode-side separator 38a and the cathode-side separator 38c are formed of different materials, from the perspective of the dent of the seal portion 50 being stopped by the bulge portions 60, it is preferable that the materials and shapes of the anode-side separator 38a and the cathode-side separator 38c be selected so that rigidity of the bulge portions 60 of the cathode-side separator 38c is higher than that of the seal portion 50 of the anode-side separator 38a.

Also, depending on the amount of dent of the seal portion 50, the seal portion 50 may be plastically deformed. Plastic deformation of the seal portion 50 causes a decrease in reaction force from the seal portion 50, resulting in a decrease in sealing surface pressure, and/or failure in re-assembling because the seal portion 50 is not restored to its original shape. Therefore, it is preferable to set the height of the bulge portions 60 as a height that makes the dent of the seal portion 50 remain within an elastic deformation range.

Figure 7A:
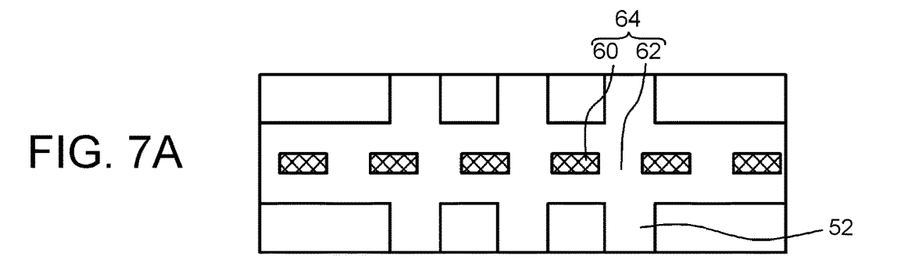
FIG. 7A is a plan view of a single cell in a first modified example of the first embodiment.
Figure 7B:
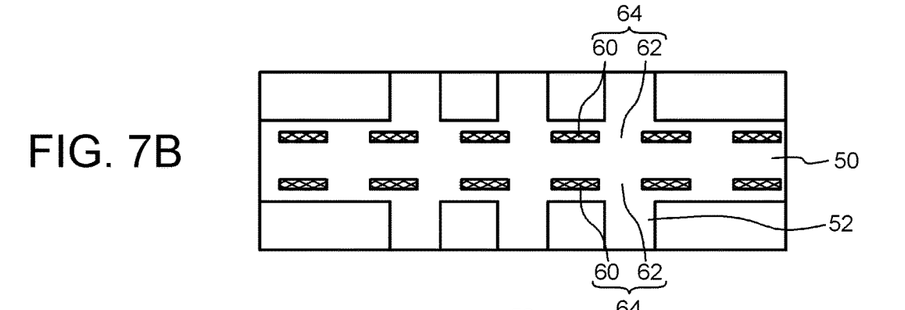
FIG. 7B is a plan view of a single cell in a second modified example of the first embodiment.
Figure 7C:
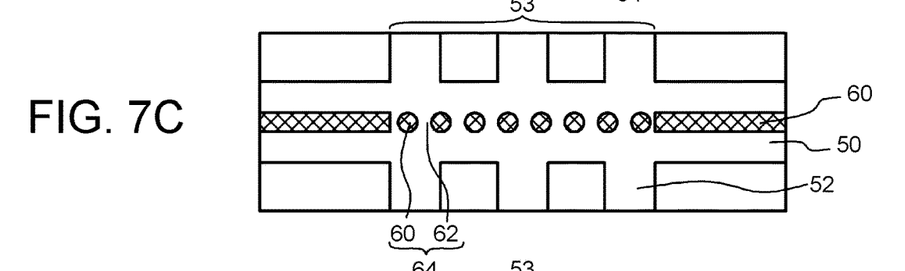
FIG. 7C is a plan view of a single cell in a third modified example of the first embodiment.
Figure 7D:
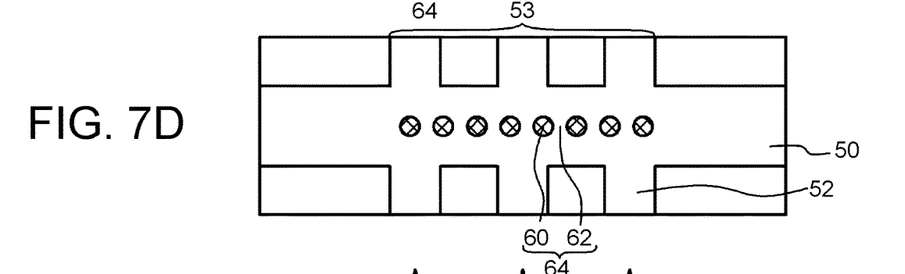
FIG. 7D is a plan view of a single cell in a fourth modified example of the first embodiment.
Figure 7E:
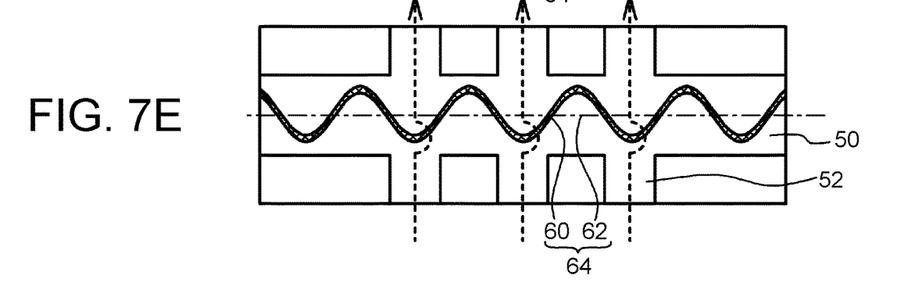
FIG. 7E is a plan view of a single cell in a fifth modified example of the first embodiment.

FIGS. 7A to 7E are plan views of single cells in modified examples 1 to 5 of the first embodiment, respectively. As illustrated in FIG. 7A, bulge portions 60 forming a flat-and-bulge portion 64 are not limited to ones having a hemispherical shape and may be ones having a rectangular parallelepiped shape (a rectangular shape in plan view). As illustrated in FIG. 7B, bulge portions 60 may be provided in such a manner that the bulge portions 60 are divided in a width direction of the seal portion 50 so as to avoid a part on which a load is directly imposed upon the seal portion 50 and the electric insulating frame 46 being brought into contact with each other. As illustrated in FIG. 7C, a flat-and-bulge portion 64 may be provided in a fluid passage area 53 in which a plurality of fluid passage portions 52 are provided and a bulge portion 60 may be continuously formed in each of areas other than the fluid passage area 53. As illustrated in FIG. 7D, a flat-and-bulge portion 64 is formed in a fluid passage area 53 in which a plurality of fluid passage portions 52 are provided and no bulge portion 60 may be formed in each of areas other than the fluid passage area 53 and such areas may be flat. As illustrated in FIG. 7E, a wave-shaped bulge portion 60 extending along the region where a seal portion 50 and an electric insulating frame 46 abut against each other (indicated by the alternate long and short dash line) and having an amplitude in a direction parallel to a flat surface may be provided. As a result of provision of such wave-shaped bulge portion 60, a flat-and-bulge portion 64 including a bulge portion 60 and a flat portion 62 between the respective ridges of the bulge portion 60 is formed in a part corresponding to the part of abutment between the seal portion 50 and the electric insulating frame 46.

As described above, the flat-and-bulge portion 64 provided in the cathode-side separator 38c may be formed by extending a plurality of bulge portions 60 in the flat surface, along the region where the seal portion 50 and the electric insulating frame 46 abut against each other or may be formed by providing a wave-shaped bulge portion 60 extending along the region where the seal portion 50 and the electric insulating frame 46 abut against each other and having an amplitude in a direction parallel to the flat surface.

Second Embodiment

Figure 8A:
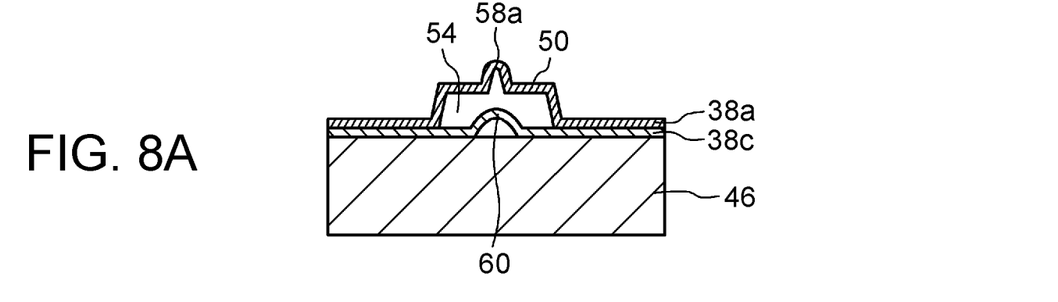
FIG. 8A is a sectional view of a single cell in a second embodiment before stacking.
Figure 8B:
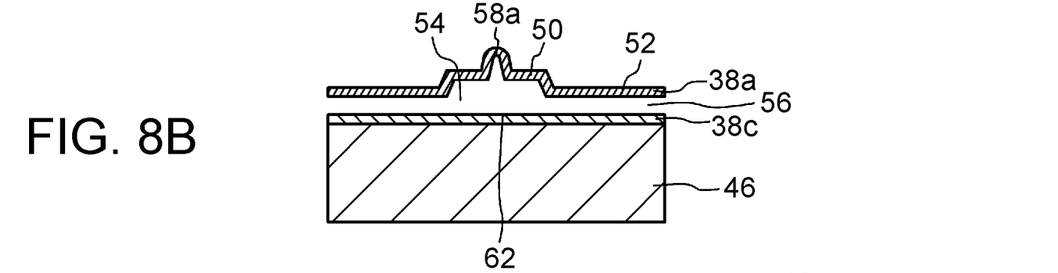
FIG. 8B is a sectional view of the single cell in the second embodiment before stacking.
Figure 8C:
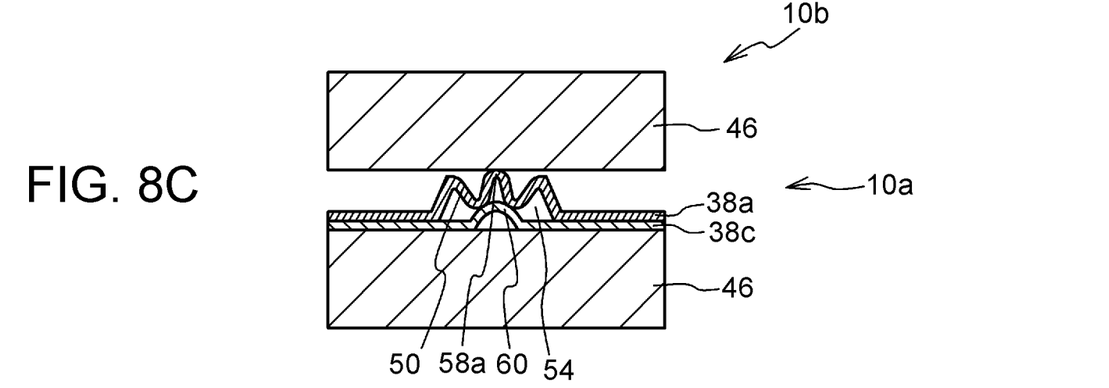
FIG. 8C is a sectional view of single cells after stacking.
Figure 8D:
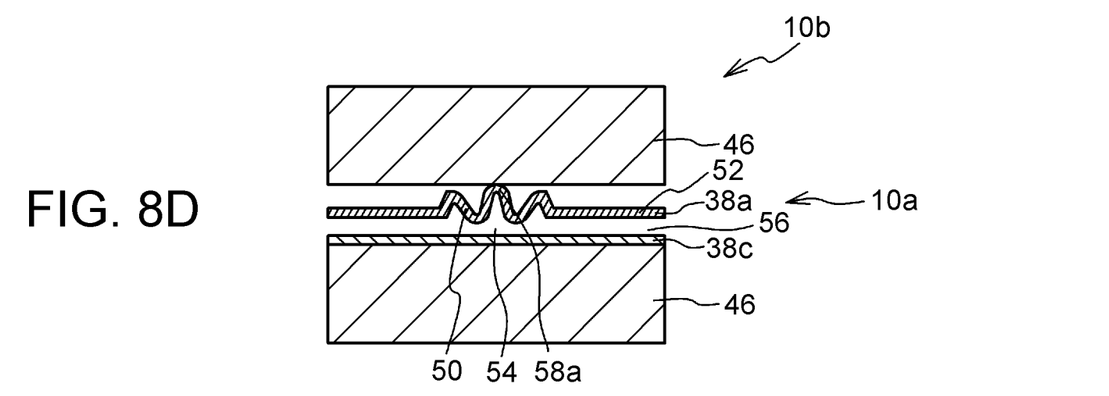
FIG. 8D is a sectional view of single cells after stacking.

FIGS. 8A and 8B are sectional views of a single cell in a second embodiment before stacking, and FIGS. 8C and 8D are sectional views of single cells after stacking. As illustrated in FIGS. 8A and 8B, in the second embodiment, no protrusion is provided in an electric insulating frame 46, and instead, a protrusion 58a is provided in a seal portion 50 of an anode-side separator 38a. The rest of the configuration is the same as that of the first embodiment and thus description thereof will be omitted.

As illustrated in FIGS. 8C and 8D, a protrusion 58a of a seal portion 50 provided in an anode-side separator 38a of a first single cell 10a is in abutment with an electric insulating frame 46 of a second single cell 10b adjacent to the first single cell 10a. Consequently, a reaction force is generated as a result of the seal portion 50 being dented and elastically deformed, and a fluid flowing in the relevant manifold is thus encapsulated.

As in the second embodiment, it is possible that a protrusion 58a is provided in a seal portion 50 and the seal portion 50 and an electric insulating frame 46 is in abutment with each other via the protrusion 58a. In this case, also, pressure of the surface of contact between the seal portion 50 and the electric insulating frame 46 can be increased.

Third Embodiment

Figure 9A:
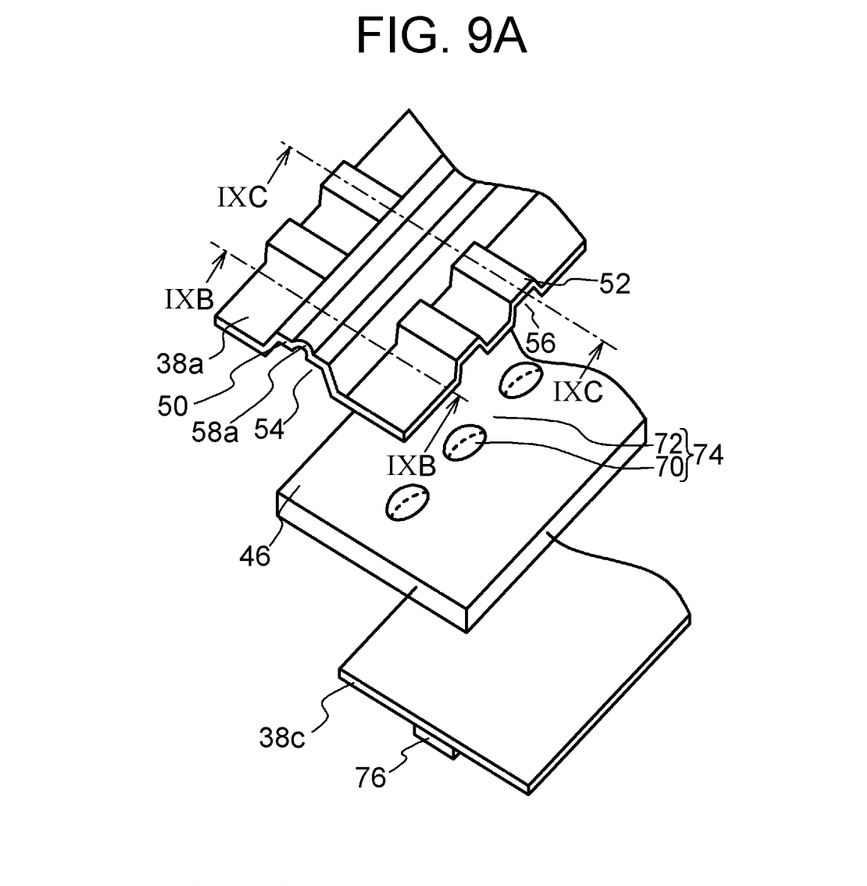
FIG. 9A is an exploded perspective view of a single cell in a third embodiment before stacking.
Figure 9B:
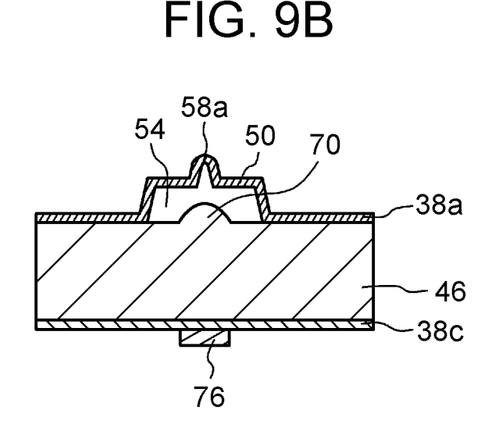
FIG. 9B is a sectional view along line IXB-IXB in FIG. 9A.
Figure 9C:
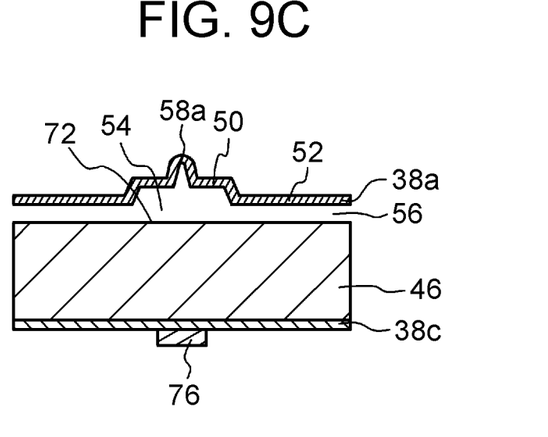
FIG. 9C is a sectional view along line IXC-IXC in FIG. 9A.

Each single cell 10 in a third embodiment has a structure in which a MEGA 40 and an electric insulating frame 46 are held between an anode-side separator 38a and a cathode-side separator 38c. FIG. 9A is an exploded perspective view of a single cell in the third embodiment before stacking, FIG. 9B is a sectional view along line IXB-IXB in FIG. 9A, and FIG. 9C is a sectional view along line IXC-IXC in FIG. 9A. As illustrated in FIGS. 9A to 9C, as in the first embodiment, the anode-side separator 38a is provided with a seal portion 50 and fluid passage portions 52. As in the second embodiment, the seal portion 50 is provided with a protrusion 58a.

A plurality of hemispherical bulge portions 70 are formed in a dotted manner in a surface of a part of the electric insulating frame 46, the part facing the seal portion 50, along a direction in which the seal portion 50 extends. In other words, the bulge portions 70 are positioned inside a hollow 54 of the seal portion 50. Consequently, a flat-and-bulge portion 74 that includes bulge portions 70 and flat portions 72 between the respective bulge portions 70 and extends along the direction in which the seal portion 50 extends is formed in the surface of the electric insulating frame 46, the surface facing the seal portion 50. The flat-and-bulge portion 74 is provided, for example, as with the seal portion 50, so as to completely surround the periphery of a relevant manifold.

An elastic member 76 is provided at a part of a surface on the opposite side of the cathode-side separator 38c from the electric insulating frame 46, the part being positioned immediately below the seal portion 50 provided in the anode-side separator 38a. The elastic member 76 is provided so as to extend along the direction in which the seal portion 50 extends, and is provided, for example, as with the seal portion 50, so as to completely surround the periphery of the manifold. The elastic member 76 is formed of, for example, rubber or an elastomer resin and is formed by means of coating or sheet attachment.

Figure 10A:
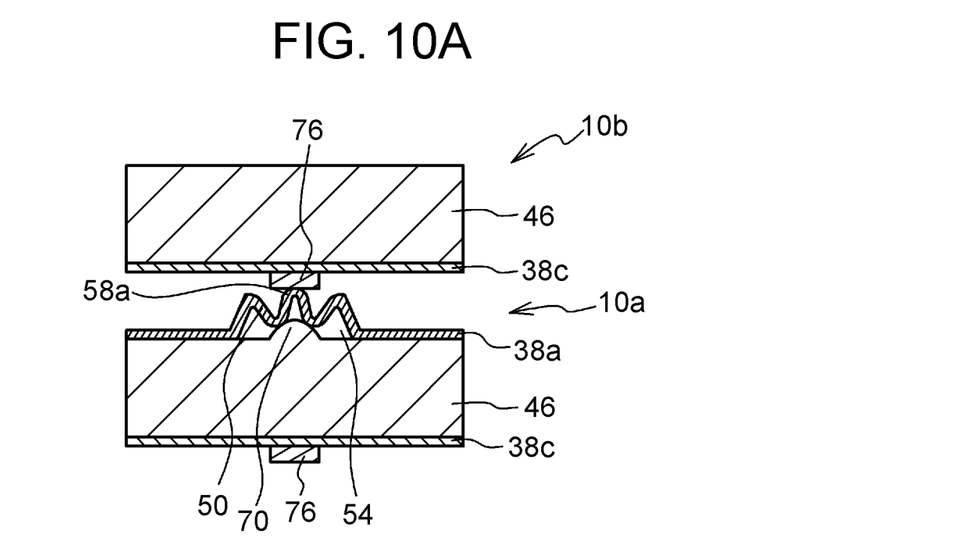
FIG. 10A is a sectional view of single cells in the third embodiment after stacking.
Figure 10B:
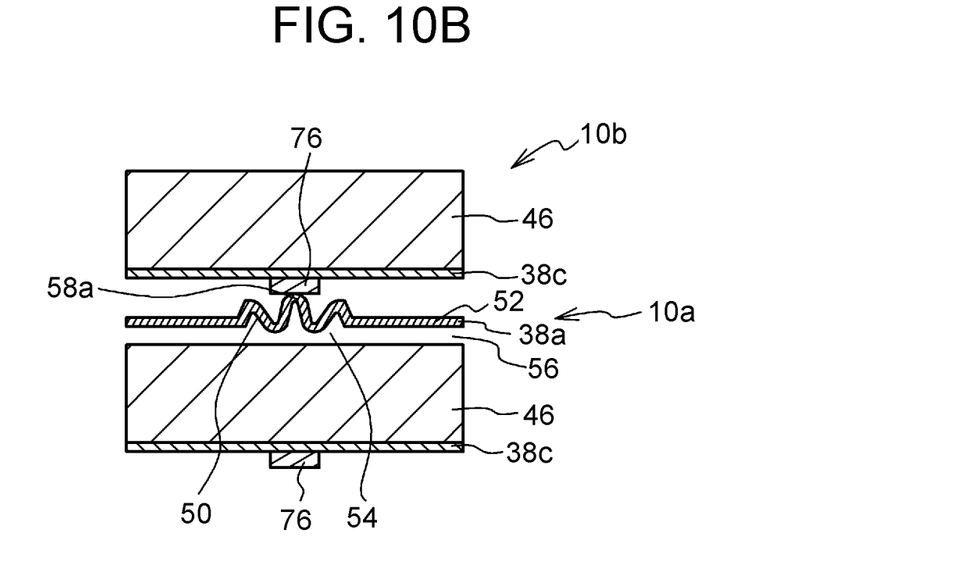
FIG. 10B is a sectional view of single cells in the third embodiment after stacking.

FIGS. 10A and 10B are sectional views of single cells in the third embodiment after stacking. As illustrated in FIGS. 10A and 10B, a protrusion 58a of a seal portion 50 provided in an anode-side separator 38a of a first single cell 10a is in abutment with an elastic member 76 provided at a cathode-side separator 38c of a second single cell 10b adjacent to the first single cell 10a. Consequently, a reaction force is generated as a result of the seal portion 50 being dented and elastically deformed, and a fluid flowing in the manifold is thus encapsulated.

According to the third embodiment, as illustrated in FIGS. 9A to 10B, the flat-and-bulge portion 74 is provided in the surface of the electric insulating frame 46, the surface facing the seal portion 50, the flat-and-bulge portion 74 extending along the region where the seal portion 50 and the elastic member 76 abut against each other. Consequently, even if the seal portion 50 is dented as a result of being brought into abutment with the elastic member 76, the amount of dent of the seal portion 50 is limited by the bulge portions 70, and thus a flow passageway of the fluid flowing in the fluid passage portions 52 can be secured. Thus, difficulty in the fluid flowing in the fluid passage portions 52 can be suppressed. Here, in the third embodiment, the anode-side separator 38a corresponds to the first separator in the claims, the electric insulating frame 46 corresponds to the first member, and the elastic member 76 corresponds to the second member.

In the third embodiment, also, the bulge portions 70 provided in the electric insulating frame 46 may be made to have any of the shapes illustrated in FIGS. 7A to 7E in the first embodiment. Also, as in the first embodiment, a protrusion may be provided in the elastic member 76 without providing the protrusion 58a in the seal portion 50.

Fourth Embodiment

Figure 11A:
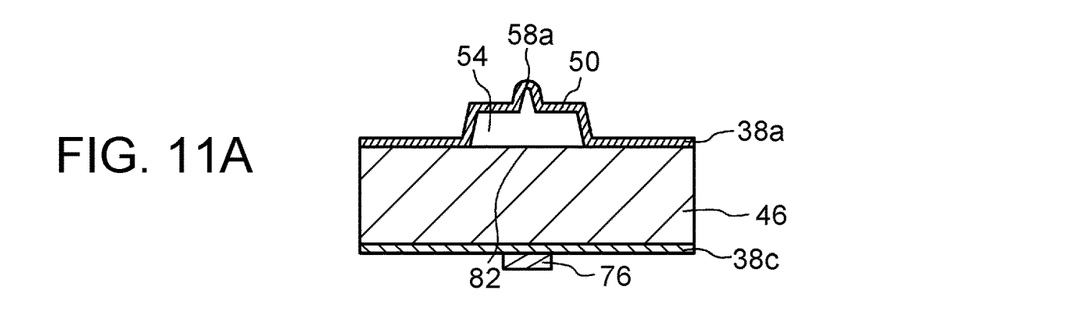
FIG. 11A is a sectional view of a single cell in a fourth embodiment before stacking.
Figure 11B:
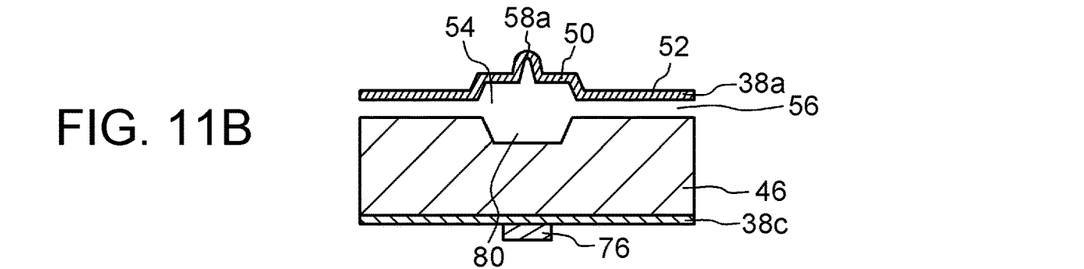
FIG. 11B is a sectional view of the single cell in the fourth embodiment before stacking.
Figure 11C:
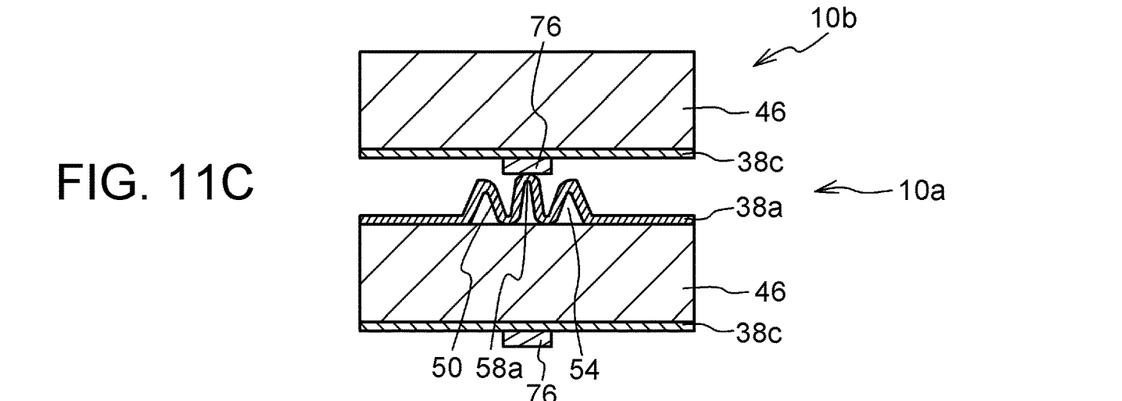
FIG. 11C is a sectional view of single cells in the fourth embodiment after stacking.
Figure 11D:
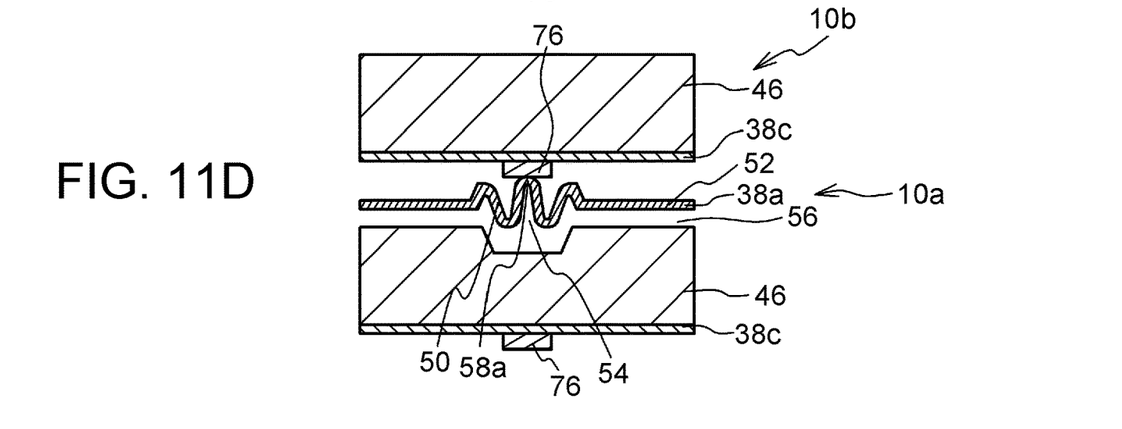
FIG. 11D is a sectional view of single cells in the fourth embodiment after stacking.

FIGS. 11A and 11B are sectional views of a single cell in a fourth embodiment before stacking, and FIGS. 11C and 11D are sectional views of single cells after staking. As illustrated in FIGS. 11A and 11B, in the fourth embodiment, a plurality of dent portions 80 each having a rectangular shape in plan view are formed in a dotted manner in a flat surface of a part of an electric insulating frame 46, the part facing a seal portion 50, along a direction in which the seal portion 50 extends. Consequently, a flat-and-bulge portion that includes the dent portions 80 and flat portions 82 between the respective dent portions 80 and extends along the direction in which the seal portion 50 extends is formed in the surface of the electric insulating frame 46, the surface facing the seal portion 50. It is preferable that the dent portions 80 be provided in parts in which fluid passage portions 52 and the seal portion 50 cross each other. The rest of the configuration is the same as that of the third embodiment and thus, description thereof will be omitted.

As illustrated in FIGS. 11C and 11D, a protrusion 58a of a seal portion 50 provided in an anode-side separator 38a of a first single cell 10a is in abutment with an elastic member 76 provided at a cathode-side separator 38c of a second single cell 10b adjacent to the first single cell 10a. Consequently, a reaction force is generated as a result of the seal portion 50 being dented and elastically deformed, and a fluid flowing a relevant manifold is thus encapsulated.

According to the fourth embodiment, as illustrated in FIGS. 11A to 11D, as a result of the dent portions 80 being formed in the flat surface of the electric insulating frame 46, the flat surface facing the seal portion 50, the flat-and-bulge portion is formed along the region where the seal portion 50 and the elastic member 76 abut against each other. Consequently, even if the seal portion 50 is dented as a result of being brought into abutment with the elastic member 76, a flow passageway of the fluid flowing in the fluid passage portions 52 can be secured, and thus difficulty in the fluid flowing in the fluid passage portions 52 can be suppressed.

Also, according to the fourth embodiment, a side surface of each of the dent portions 80 has a tapered shape. Consequently, the flow of the fluid can be smoothed. Also, from the perspective of smoothing the flow of the fluid, the dent portions 80 may have a hemispherical shape.

Also, in the first embodiment and the second embodiment, also, a flat-and-bulge portion may be formed by providing dent portions in the flat surface of the cathode-side separator 38c.

Fifth Embodiment

Figure 12A:
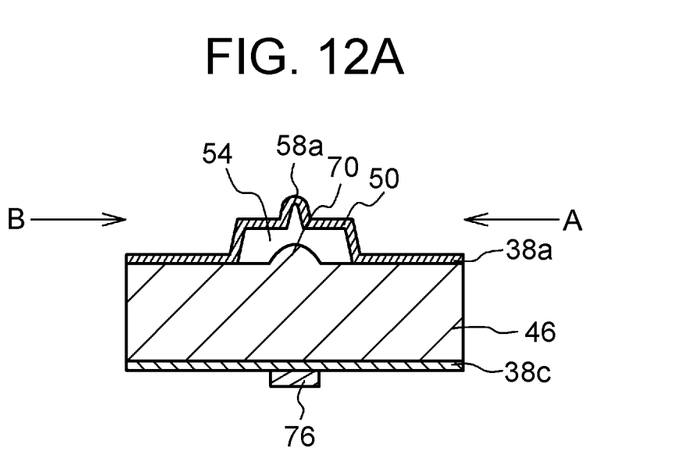
FIG. 12A is a sectional view of a single cell in a fifth embodiment before stacking.
Figure 12B:
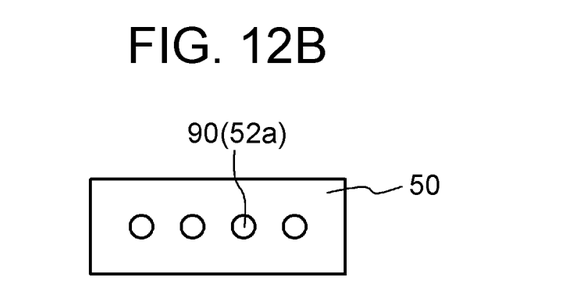
FIG. 12B is a side view of a seal portion as viewed in direction A and direction B in FIG. 12A.

FIG. 12A is a sectional view of a single cell in a fifth embodiment before stacking, and FIG. 12B is a side view of a seal portion as viewed in direction A and direction B in FIG. 12A. As illustrated in FIGS. 12A and 12B, in the fifth embodiment, no fluid passage portions each formed of a hollow protrusion are provided. Through-holes 90 that makes a hollow 54 of a seal portion 50 and the outside of the seal portion 50 communicate with each other are provided in side surfaces of the seal portion 50, and the through-holes 90 serve as fluid passage portions 52a. In other words, since a fluid flowing in a relevant manifold is encapsulated by the seal portion 50, provision of the through-holes 90 in the side surfaces of the seal portion 50 enables the fluid to flow between the manifold and a space on the opposite side of the seal portion 50 from the manifold via the hollow 54 of the seal portion 50. The rest of the configuration is the same as that of the third embodiment and thus description thereof will be omitted.

As in the fifth embodiment, the fluid passage portions 52a may be formed of the through-holes 90 that are provided in the side surfaces of the seal portion 50 and make the hollow 54 of the seal portion 50 and the outside of the seal portion 50 communicate with each other. In this case, the manufacture is easy compared to the case where communication portions each including a hollow protrusion are provided.

Although in the first to fifth embodiments, the case where the seal portion 50 and the fluid passage portions 52, 52a are provided in the anode-side separator 38a is indicated as an example, the seal portion 50 and the fluid passage portions 52, 52a may be provided in the cathode-side separator 38c.

Although embodiments of the present disclosure have been described in detail above, the present disclosure is not limited to such particular embodiments and various modifications and changes are possible within the scope of the present disclosure.

What is claimed is:

1. A fuel cell stack comprising a plurality of single cells stacked, and a manifold that is provided so as to extend through the plurality of single cells and allows a fluid to flow therein, wherein:
   each single cell of the plurality of single cells includes:
   a first separator including a protrusion including (i) a seal portion that surrounds a periphery of the manifold and (ii) a fluid passage portion,
   a first member disposed on a side of the first separator such that (i) a first space is arranged between the protrusion and the first member and (ii) the fluid passage portion allows the fluid to flow between the manifold and a second space on an opposite side of the seal portion from the manifold via the first space, the side being opposite to a side on which the seal portion projects, and
   a second member that is provided on an opposite side of the first member from the first separator and includes a first elastic member;
   the seal portion of a first single cell from among the plurality of single cells is in abutment with the second member of a second single cell adjacent to the first single cell;
   the first member of the first single cell includes a flat-and-bulge portion in a surface of the first member, the surface facing the seal portion, the flat-and-bulge portion extending along a region where the seal portion and the second member of the second single cell abut against each other;
   wherein the region extends in a flat-and-bulge portion direction which is perpendicular to a direction of the fluid flow between the manifold and the second space.

2. The fuel cell stack according to claim 1, wherein:
   the seal portion or the second member of each single cell includes a ridge; and
   the seal portion of the first single cell and the second member of the second single cell are in abutment with each other via the ridge.

3. The fuel cell stack according to claim 1, wherein the fluid passage portion extends so as to cross the seal portion, and a third space is arranged between the fluid passage portion and the first member.

4. The fuel cell stack according to claim 1, wherein the fluid passage portion includes a through-hole that is provided in a side wall of the seal portion and makes the first space and an outside of the seal portion communicate with each other.

5. The fuel cell stack according to claim 1, wherein the second member includes rubber or an elastomer resin.

6. The fuel cell stack according to claim 1, wherein:
   the first member is a second separator; and
   the second member is an electric insulating frame surrounding a membrane electrode assembly of the single cell.

7. The fuel cell stack according to claim 1, wherein:
   each single cell includes a second separator;
   the first member is an electric insulating frame held between the first separator and the second separator; and
   the second member is a second elastic member disposed on a surface on an opposite side of the second separator from the electric insulating frame.

8. The fuel cell stack according to claim 1, wherein the first member includes the flat-and-bulge portion as a result of a plurality of bulge portions or a plurality of dent portions being extending in a flat surface of the first member along the region where the seal portion and the second member abut against each other.

9. The fuel cell stack according to claim 1, wherein the flat-and-bulge portion of the first member includes a wave-shaped bulge portion provided in a flat surface of the first member, the wave-shaped bulge portion extending along the region where the seal portion and the second member abut against each other and having an amplitude in a direction parallel to the flat surface.

* * * * *